(12) United States Patent
Chernyak et al.

(10) Patent No.: US 12,445,623 B2
(45) Date of Patent: Oct. 14, 2025

(54) ADAPTIVE RANGE FOR CLIPPING PROCESSES FOR VIDEO AND IMAGE COMPRESSION

(71) Applicant: Tencent America LLC, Palo Alto, CA (US)

(72) Inventors: Roman Chernyak, Palo Alto, CA (US); Biao Wang, Palo Alto, CA (US); Xin Zhao, Palo Alto, CA (US); Lien-Fei Chen, Palo Alto, CA (US); Madhu Peringassery Krishnan, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 59 days.

(21) Appl. No.: 18/502,003

(22) Filed: Nov. 4, 2023

(65) Prior Publication Data

US 2025/0063172 A1     Feb. 20, 2025

Related U.S. Application Data

(60) Provisional application No. 63/532,664, filed on Aug. 14, 2023.

(51) Int. Cl.
*H04N 19/132* (2014.01)
*H04N 19/124* (2014.01)
*H04N 19/70* (2014.01)

(52) U.S. Cl.
CPC ......... *H04N 19/132* (2014.11); *H04N 19/124* (2014.11); *H04N 19/70* (2014.11)

(58) Field of Classification Search
CPC ..... H04N 19/132; H04N 19/124; H04N 19/70
See application file for complete search history.

(56) References Cited

U.S. PATENT DOCUMENTS

| 6,147,771 | A * | 11/2000 | Washio | H04N 1/4052 |
| | | | | 358/1.9 |
| 11,064,209 | B2 * | 7/2021 | Fu | H04N 19/61 |
| 11,490,095 | B1 * | 11/2022 | Lu | H04N 19/182 |
| 12,015,786 | B2 * | 6/2024 | Lu | H04N 19/82 |

(Continued)

FOREIGN PATENT DOCUMENTS

WO    WO 2021138476 A1    7/2021

OTHER PUBLICATIONS

Tencent Technology, ISR/WO, PCT/US2023/037121, Mar. 4, 2024, 22 pgs.

*Primary Examiner* — Fabio S Lima
(74) *Attorney, Agent, or Firm* — Morgan, Lewis & Bockius LLP

(57) ABSTRACT

The various implementations described herein include methods and systems for coding video. In one aspect, a method includes receiving a video bitstream that includes encoded video data and one or more syntax elements indicating one or more clipping ranges. The method includes deriving, based on the one or more syntax elements, the one or more clipping ranges for a portion of the encoded video data. Each of the one or more clipping ranges modifies a range of sample values of the received video bitstream. The method includes performing one or more clipping operations on the encoded video data using the derived one or more clipping ranges.

16 Claims, 5 Drawing Sheets

(56) References Cited

U.S. PATENT DOCUMENTS

| | | | |
|---|---|---|---|
| 2007/0222652 A1* | 9/2007 | Cattone | H04N 19/48 |
| | | | 375/E7.199 |
| 2013/0322527 A1 | 12/2013 | Guo et al. | |
| 2020/0053358 A1 | 2/2020 | Moon et al. | |
| 2021/0400310 A1* | 12/2021 | Zhang | H04N 19/186 |
| 2022/0060703 A1 | 2/2022 | Kotra et al. | |
| 2022/0078415 A1* | 3/2022 | Taquet | H04N 19/136 |
| 2022/0264106 A1* | 8/2022 | Zhang | H04N 9/77 |
| 2022/0272335 A1* | 8/2022 | Liu | H04N 19/82 |
| 2022/0368911 A1 | 11/2022 | Kerofsky et al. | |
| 2023/0103632 A1 | 4/2023 | Zhao et al. | |
| 2023/0139083 A1* | 5/2023 | Zhao | H04N 19/176 |
| | | | 375/240.02 |
| 2023/0164312 A1* | 5/2023 | Andersson | H04N 19/117 |
| | | | 375/240.02 |

* cited by examiner

ADAPTIVE RANGE FOR CLIPPING PROCESSES FOR VIDEO AND IMAGE COMPRESSION

RELATED APPLICATIONS

This application claims priority to U.S. Provisional Patent Application No. 63/532,664, entitled "Adaptive Range for Clipping Processes for Video and Image Compression" filed Aug. 14, 2023, which is hereby incorporated by reference in its entirety.

TECHNICAL FIELD

The disclosed embodiments relate generally to video coding, including but not limited to systems and methods for providing an adaptive range for clipping processes for video and image compression.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes selecting a clipping range adaptively depending on additional information from input signal and/or internal codec characteristics. The use of an adaptively-determined clipping range can improve the coding process by reducing noise from clipped portions of the decoded video data, which may be introduced by the codec itself (e.g., such codec noise may affect prediction accuracy), for example, during the quantization step (e.g., as quantization noise) and/or regions from which no useful data is encoded.

In accordance with some embodiments, a method of video decoding is provided. The method includes receiving a video bitstream (e.g., a coded video sequence) that includes encoded video data and one or more syntax elements indicating one or more clipping ranges. The method includes deriving, based on the one or more syntax elements, the one or more clipping ranges for a portion of the encoded video data. Each of the one or more clipping ranges modifies a range of sample values of the received video bitstream. The method includes performing one or more clipping operations on the encoded video data using the derived one or more clipping ranges.

In accordance with some embodiments, a method of video encoding is provided. The method includes receiving a current picture; determining for the current picture, based on characteristics of the current picture, a first portion of the current picture to be clipped with a first clipping range, where the first clipping range is different from a default range associated with the current picture; and encoding, into a video bitstream, information indicating the first clipping range.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes, among other things, selecting a clipping range adaptively depending on additional information from an input signal and/or internal codec characteristics. The additional information may either be signaled in the bitstream or can be derived at the decoder. As used herein, "clipping range" or "clipping ranges" may relate to any and all combinations of signal color component(s) (e.g., Y, Cb, Cr, R, G, B, or others). The use of an adaptively determined clipping range can improve the coding process by reducing noise from clipped portions of the decoded video data, which may be introduced by the codec itself (e.g., such codec noise may affect prediction accuracy), for example, during the quantization step (e.g., as quantization noise) and/or regions from which no useful data is encoded.

Example Systems and Devices

Figure 1:
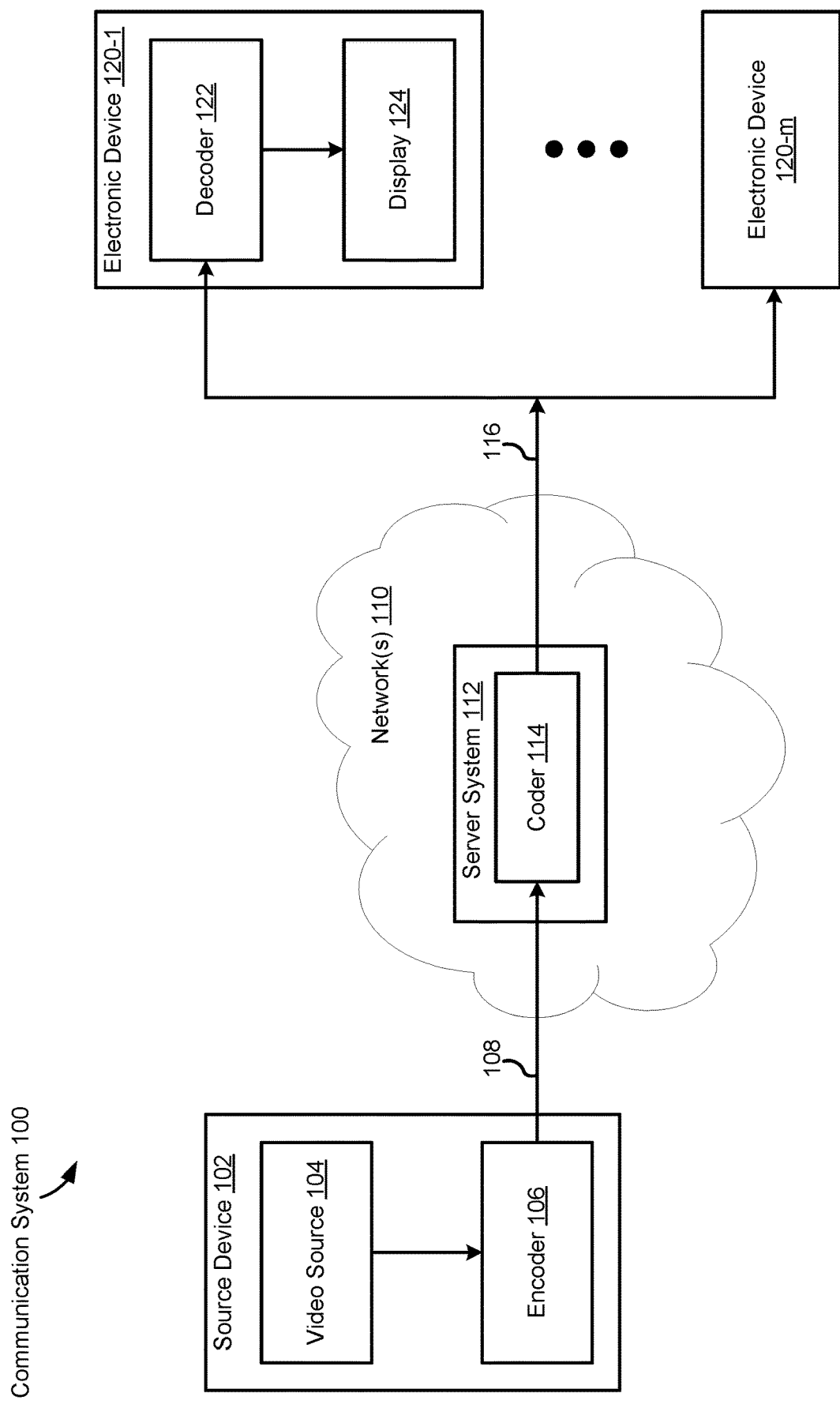
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
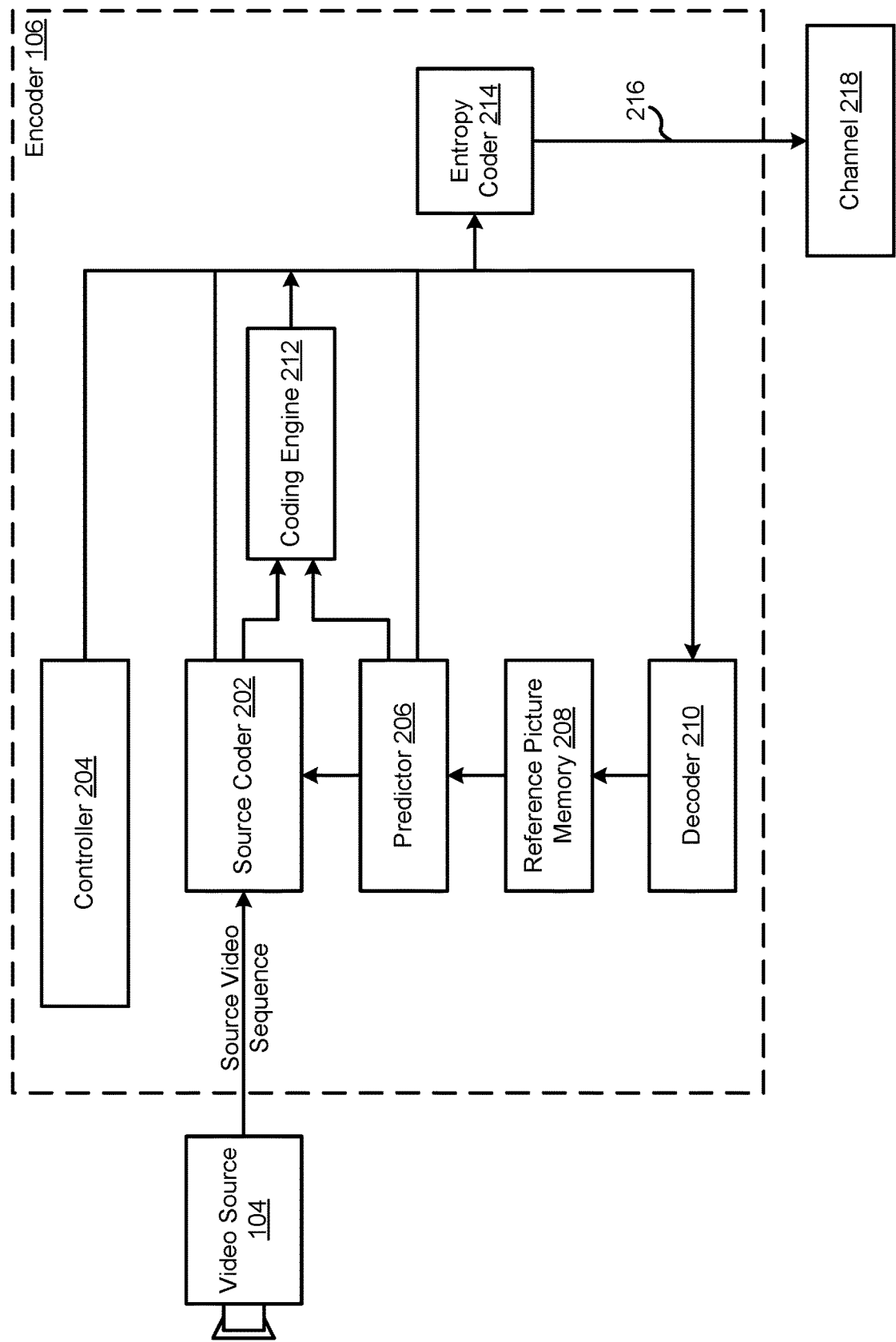
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
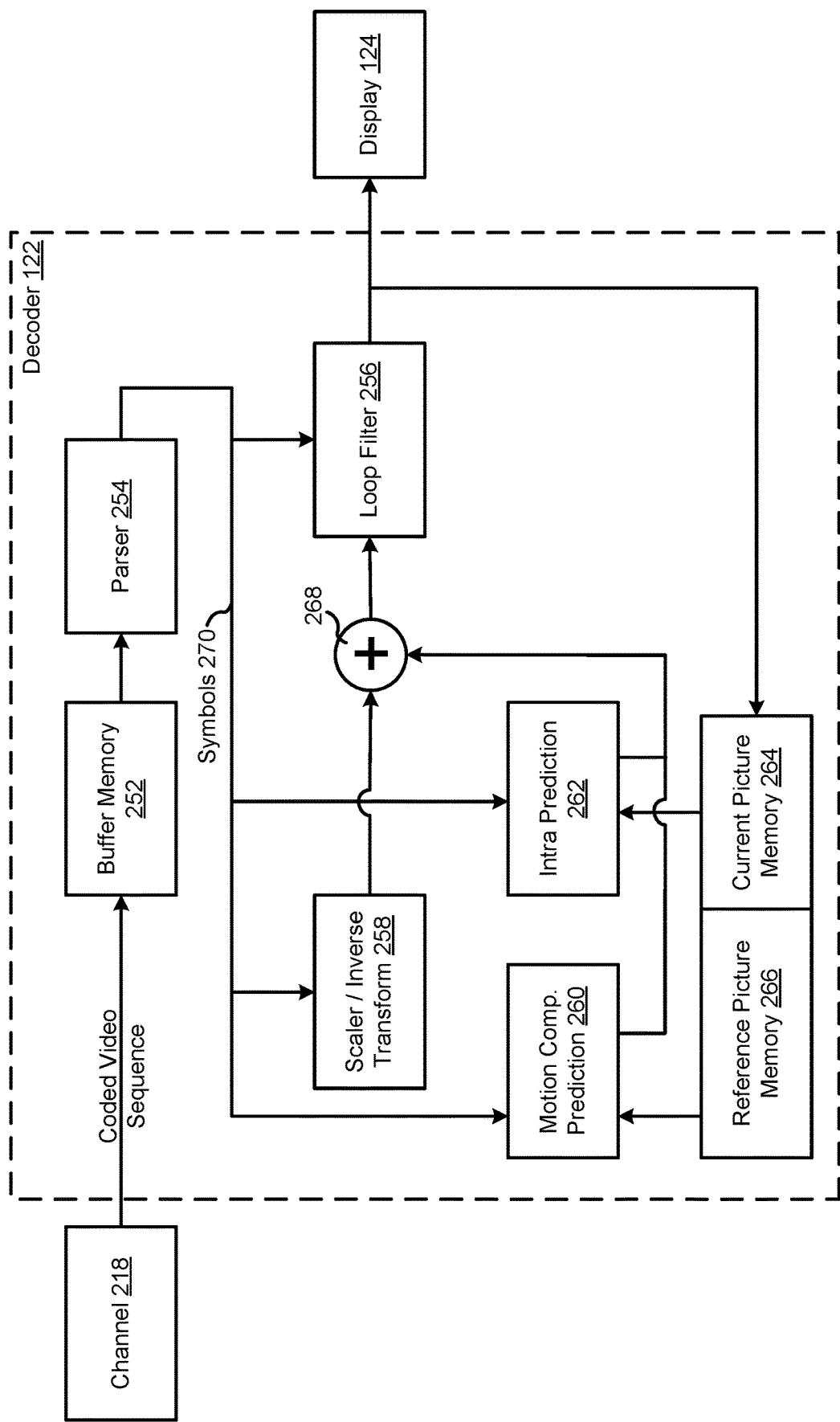
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
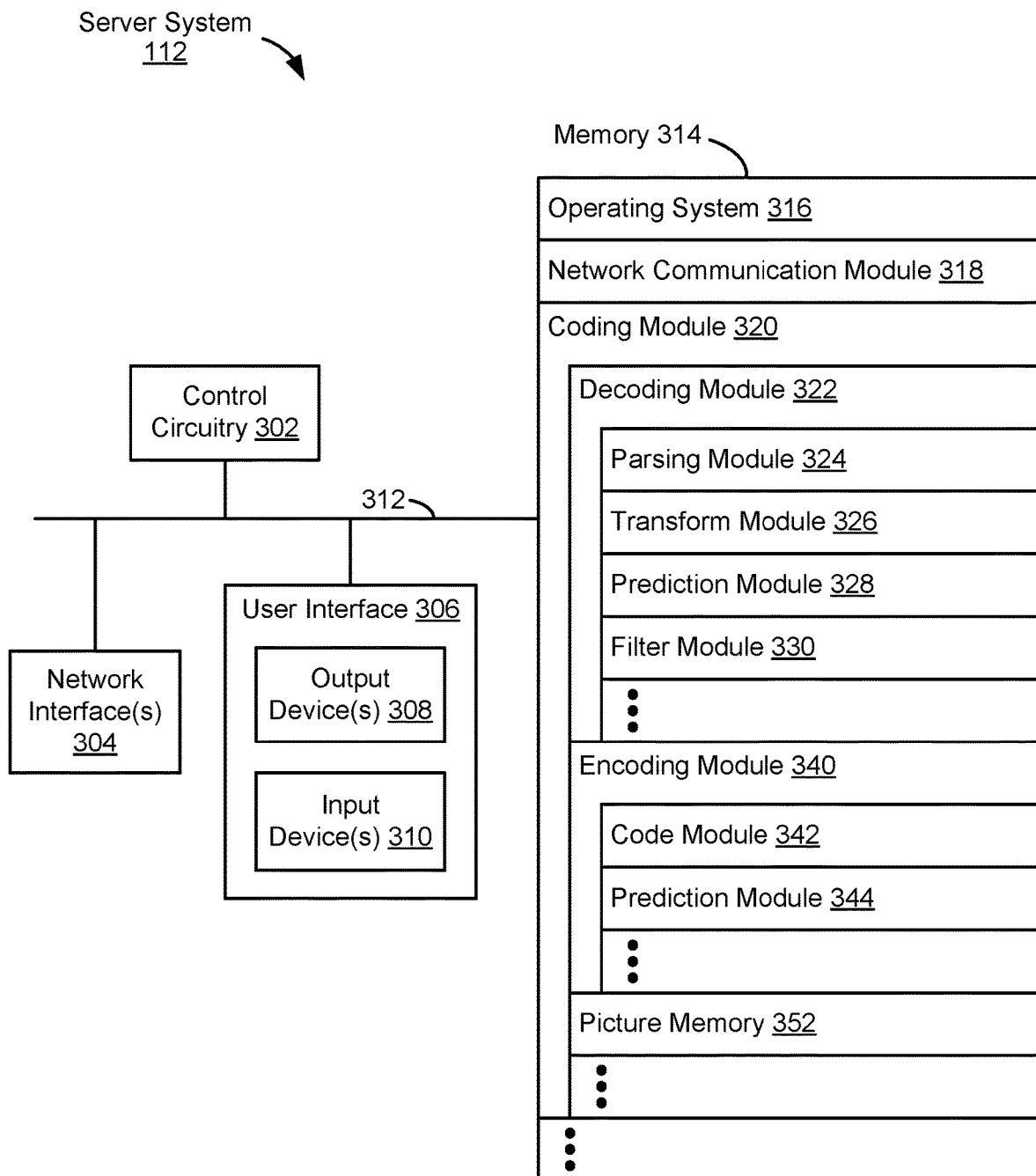
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

The coding processes and techniques described below may be performed at the devices and systems described above (e.g., the source device 102, the server system 112, and/or the electronic device 120).

A hybrid video codec may include two or more of: intra prediction, inter prediction, transform coding, quantization, entropy coding, and post in-loop filter. The coding processes and techniques described herein can be used in clipping processes for different parts of the codec. In some embodiments, the use of an adaptive clipping range, instead of a fixed clipping range dependent only on internal (codec) bit depth, improves the compression efficiency of the video codec. A bit-depth based clipping (e.g., for a clipping range of (0, 2^bitdepth−1)) can be applied to multiple operations in the codec to avoid data overflow, such as in filtering, sampling, interpolation, weighted prediction, weighted combination, reconstruction, and other stages, to ensure that the generated prediction and reconstruction samples remain in a defined dynamic range.

A clipping range (x,y) of a clipping process determines the minimal and maximal values of the samples after the clipping process. In some embodiments, the clipping range (x,y) is inclusive of the upper and lower bounds, or the minimal and maximal values x and y of the clipping range. For example, if an internal bit depth is set to 8 bits, each sample of the subject signal is in range of (0, 255), the clipping process for each sample z may be set as shown in Equation 1 below.

$$\text{Clip}(0, 255, z) = \begin{cases} 0, & z < 0 \\ 255, & z > 255 \\ z, & \text{otherwise} \end{cases} \quad \text{Equation 1--Example 8-bit Clipping}$$

Similarly, if the internal bit depth is set to 10 bits, the clipping process for each sample z throughout the coding/decoding process may be as shown in Equation 2 below.

$$\text{Clip}(0, 1023, z) = \begin{cases} 0, & z < 0 \\ 1023, & z > 1023 \\ z, & \text{otherwise} \end{cases} \quad \text{Equation 2--Example 10-bit Clipping}$$

In general form this can be written as shown in Equations 3 and 4 below.

$$\text{Clip}(x, y, z) = \begin{cases} x, & z < x \\ y, & z > y \\ z, & \text{otherwise} \end{cases} \quad \text{Equation 3--Example Clipping}$$

$$\text{Clip } G(x) = \text{Clip}(0, (1 \ll \textit{BitDepth}) - 1, x) \quad \text{Equation 4--Example BitDepth Clipping range}$$

where BitDepth represents the internal (codec) bit depth.

Instead of using a fixed clipping range for all clipping operations, the coding processes and techniques described herein allow the use of an adaptively-determined clipping range (x,y) (also sometimes referred to as "clipping process range") that is based on additional information such as a) a dynamic range of the input signal; b) bit depth of the input signal; and c) a dynamic range of the internal (coding) signal. This additional information can be signaled in the bitstream and/or derived at the decoder side. In some embodiments, different color components (e.g., Y, Cb, Cr; or R, G, B) use different clipping ranges (x, y) that can be derived in the same or different ways. For example, the clipping range for the luma component can be different than the clipping range for the two chroma components. In some embodiments, different image regions (e.g., blocks, partitions, or sub-partitions) can use n different clipping ranges $(x_n, y_n)$ that can be derived in the same or different ways. As used herein, "clipping range" or "clipping ranges", without loss of generality, refer to the clipping ranges related to any color component (Y, Cb or Cr), such as one or more, each, all, or any combination of the signal color components (Y, Cb, Cr; or R, G, B).

The coding processes and techniques described herein may be applied to perform a conversion between a visual media file and a bitstream of visual media data, and the conversion may be performed in accordance with a codec. For example, a bit-depth based clipping may be applied to multiple places to avoid data overflow. The range of the bit-depth based clipping may be defined as [0, 2^bitdepth−1]. A clipping operation may be applied in filtering, sampling, interpolation, weighted prediction, weighted combination, reconstruction, and/or other stages to ensure that the generated prediction and reconstruction samples remain in the defined dynamic range.

For example, for video captured at 10-bit precision, useful information may be collected in the range (0,1023). For example, any data less than 0, or greater than 1023, should be clipped by (0, 1023). As another example, for video captured at 8-bit (e.g., under BT.2020) data is encoded in the range (16, 235), when the signal is increased from 8-bit to 10-bit, the signal range may be multiplied by 4 to reach (64, 940). Thus, in such a 10-bit signal (e.g., that spans 0 to 1023), useful information of the video may be captured (e.g., mostly captured, or only captured) from 64 to 940 (e.g., no useful data is collected from 0 to 63, or 941 to 1023). An offset can be signaled in the bitstream to set the clipping range as (64, 940), or the clipping range of (64, 940) can be set as a default, and an offset relative to the range of (64, 940) is signaled in the bitstream. For example, a signaled offset of 7 would further shift the clipping range to (57, 933) from (64, 940). In some embodiments, two offsets are signaled in the bitstream to set shift the clipping range asymmetrically at the upper bound and the lower bound. The use of an adaptively determined clipping range can improve the coding process by reducing noise from the clipped portions (e.g., boundary portions) of the decoded video data, which may be introduced by the codec itself (e.g., such codec noise may affect prediction accuracy), for example, during the quantization step (e.g., as quantization noise) and/or regions from which no useful data is encoded.

Figure 4A:
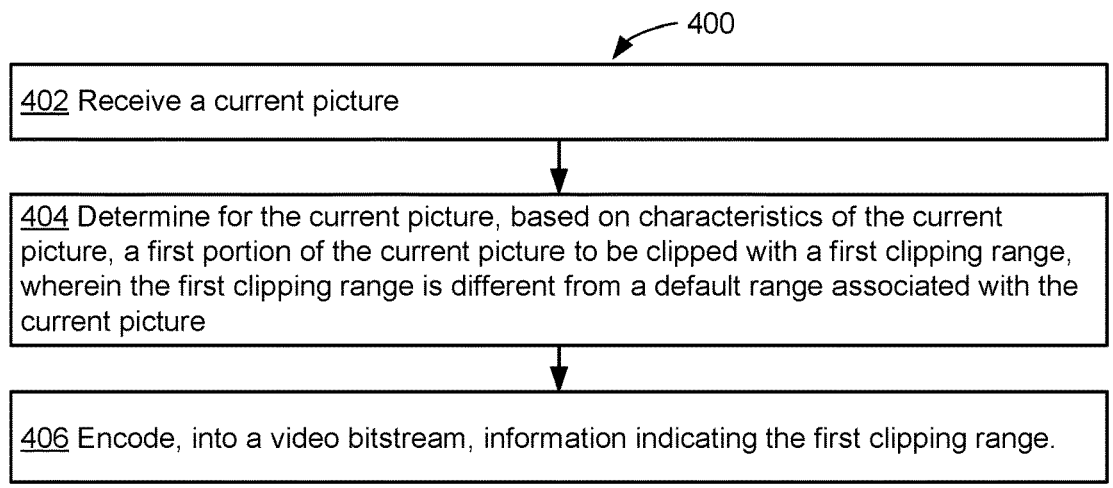
FIG. 4A is a flow diagram illustrating an example method of encoding video in accordance with some embodiments.

FIG. 4A is a flow diagram illustrating a method 400 of encoding video in accordance with some embodiments. The method 400 may be performed at a computing system (e.g., the server system 112, the source device 102, or the electronic device 120) having control circuitry and memory storing instructions for execution by the control circuitry. In some embodiments, the method 400 is performed by executing instructions stored in the memory (e.g., the memory 314) of the computing system. The system receives (402) a current picture and the system determines (404) for the current picture, based on characteristics of the current picture, a first portion of the current picture to be clipped with a first clipping range, where the first clipping range is different from a default range associated with the current picture. The system encodes (406), into a video bitstream, information indicating the first clipping range.

Figure 4B:
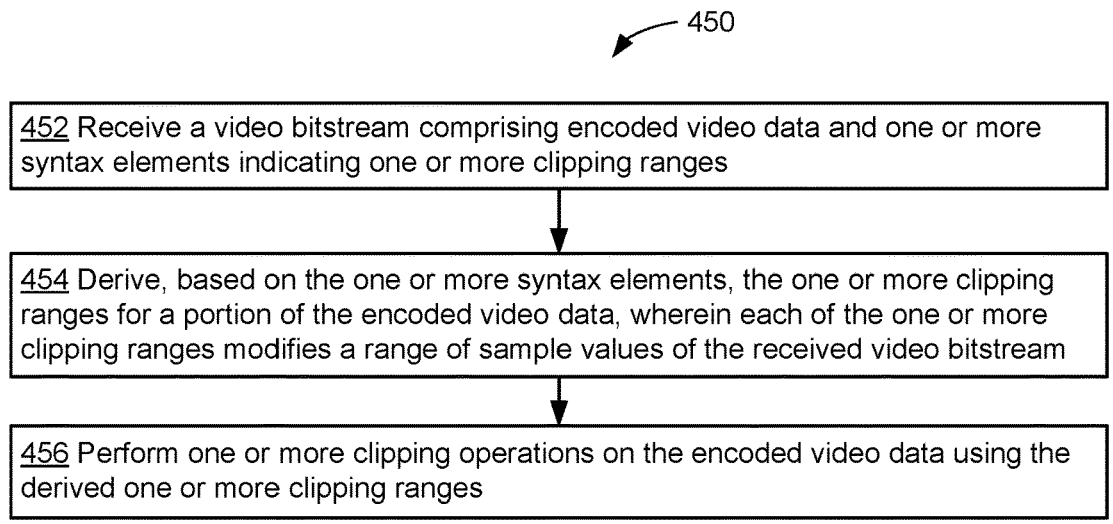
FIG. 4B is a flow diagram illustrating an example method of decoding video in accordance with some embodiments.

FIG. 4B is a flow diagram illustrating a method 450 of decoding video in accordance with some embodiments. The method 450 may be performed at a computing system (e.g., the server system 112, the source device 102, or the electronic device 120) having control circuitry and memory storing instructions for execution by the control circuitry. In some embodiments, the method 450 is performed by executing instructions stored in the memory (e.g., the memory 314) of the computing system. The system receives (452) a video bitstream comprising encoded video data and one or more syntax elements indicating (e.g., delta of offset from a base clipping range) one or more clipping ranges. The system derives (454), based on the one or more syntax elements, the one or more clipping ranges for a portion of the encoded video data, where each of the one or more clipping ranges modifies a range of sample values of the received video bitstream. The system performs (456) one or more clipping operations on the encoded video data using the derived one or more clipping ranges.

In some embodiments, one or more indicators, such as syntax elements (e.g., offset, or minimum and maximum values of the clipping range) are signaled in the bitstream of visual media data and used to derive respective clipping ranges for one or more clipping processes. The clipping range in these embodiments is determined based on characteristics of the bitstream. For example, a video bitstream may be received that includes encoded video data and one or more syntax elements indicating one or more clipping ranges. In this example, the one or more clipping ranges are derived based on the one or more syntax elements, and one or more clipping operations are performed on the encoded video data using the derived clipping range(s).

As an example, when the signaled syntax element includes an offset for a first clipping range (e.g., an original clipping range, or a modified clipping range), the derived range is different from the first clipping range. In some embodiments, the signaled syntax elements include the minimum and maximum values of the clipping range (e.g., the range is inclusive of the minimum and maximum values). In some embodiments, the derived clipping range is smaller than the first clipping range (e.g., one or more regions of the first clipping range are truncated). In some embodiments, the derived clipping range is larger than the first clipping range (e.g., beyond the range of 0 to 1023). For example, the coding processes and techniques may operate with 2 bytes (or 16 bits) in filtering or other precision-altering processes within the codec that scale the input signal up (e.g., using an enlarged range relative to an original, unaltered full range) in some intermediate processing stages even though the codec has a smaller bit depth than 16 bits.

In some embodiments, one clipping range (x, y) is signalled in the bitstream at a high level (e.g., sequence, picture, slice, or tile parameter sets, as a header, a syntax table containing one or more offsets) for the whole sequence, picture, slice, or tile. For example, one or more additional syntax elements are used to represent a range in the bitstream. In some embodiments, more than one clipping ranges (x, y) are signaled in the bitstream and used for respective clipping processes. In some embodiments, a clipping range is signaled in a high level syntax (HLS) element. In some embodiments, the HLS element is signaled at a level that is higher than a block level. For example, the HLS element may correspond to a sequence level, a frame level, a slice level, or a tile level. As another example, the HLS element may be signaled in a video parameter set (VPS), a sequence parameter set (SPS), a picture parameter set (PPS), an adaptation parameter set (APS), a slice header, a picture header, a tile header, and/or a CTU header.

The bitstream includes encoded video data having one or more types of grouping, including: as a sequence, a picture, a slice, or tile, for example. In some embodiments, the picture includes a number of blocks, and clipping ranges ($x_i$, $y_i$) are signaled in the bitstream for each block i separately. In some embodiments, the signaling is done at a low level such as at a coding unit, a prediction unit, or a transform unit, or other smaller units, and one or more additional syntax elements are used to represent one or more clipping ranges in the bitstream.

In some embodiments, a clipping range (x, y) is determined based on the information related to the input (source) signal and/or the compression (codec) process, and the derived clipping range is used for one or more clipping processes. For example, the input (source) signal corresponds to an original picture from the video source 104 and/or a prefiltered picture. The clipping range may be derived (e.g., the minimum and maximum values associated with the clipping range) from a prefiltered picture. For example, Motion Compensated Temporal Filtering (MCTF) is a pre-processing approach that may be employed prior to video encoding to improve the compression efficiency. In such cases, the minimum and maximum values associated with the clipping range may be derived based on an MCTF prefiltered picture. For example, the encoder performs the prefiltering or receives a prefiltered picture, and the encoder signals the minimum and maximum values associated with the prefiltered picture. Alternatively or additionally, the encoder signals a flag indicating that the encoded picture is a prefiltered picture or is derived from a prefiltered picture, and the decoder determines the minimum and maximum values from the prefiltered picture to derive a clipping range for a clipping operation.

In some embodiments, the clipping range (x, y) is determined based on the dynamic range of the input signal. For example, if the dynamic range of the input signal is the unrestricted (full) range from 0 to (1<<BitDepth)−1, the clipping range is set equal to (0, (1<<BitDepth)−1)). In such scenarios, one or more syntax elements may be signaled in the bitstream to identify the source signal as having an unrestricted range.

In some embodiments, the dynamic range of the input signal is a limited range from A to B, where A and B are predefined constants, and the clipping range is set equal to (A, B). In such scenarios, one or more syntax elements may be signaled in the bitstream to derive the constants A and B. For example, the dynamic range of the input signal may be a limited range specified in one of the signal processing standards, for example, (64, 940) for 10-bit signals, the clipping range is set equal to (64, 940). In some embodiments, the clipping range is inclusive of the two end points denoting the minimum and maximum values of the clipping range (e.g., 64 and 940). In such scenarios, one or more syntax elements may be signaled in the bitstream to specify the use of the predefined constants.

In some embodiments, the clipping range (x, y) is determined based on the bit depths of the input signal. For example, for an input signal having a bit depth of n bits, and a codec having a bit depth of m bits, where m≥n, the clipping range is set equal to (0, ((1<<n)−1)<<(m−n)). Thus, if the bit depth n of the input signal is 8 bits, and the bit depth m of the codec is 10 bits, the clipping range may be set equal to (0, 1020). In such scenarios, the one or more syntax elements may be signaled in the bitstream to derive the bit depth n of the input signal. For example, the bit depth n of the input signal may be signaled directly and/or derived based on a delta from the bit depth m of the codec.

In some embodiments, the clipping range (x, y) is determined based on the internal (codec) signal dynamic range. For example, if the internal (codec) signal is converted from one range domain to another, the clipping range is set equal to the final range domain. In such cases, the clipping range is determined based on the information from the bitstream that corresponds to internal signal conversion.

In some embodiments, the internal (codec) signal includes indication of an original dynamic range (A, B) that is changed during the compression process to a dynamic range of (C, D). In such scenarios, the clipping range may be set equal to (C, D).

In some embodiments, the internal (codec) signal includes indication of an original dynamic range that is more limited, and within the compression process the original dynamic range is extended to full (e.g., an extended, or enlarged) dynamic range from 0 to (1<<BitDepth)−1. In such scenarios, the clipping range may be set equal to (0, (1<<BitDepth)−1)).

In some embodiments, for an input signal having a bit depth of n bits, and a codec having a bit depth of m bits, where m<n, the clipping range is set equal to (0, ((1<<m)−1)). For example, if the bit depth of the input signal is 10 bits, and the bit depth of the codec is 8 bits, the clipping range may be set equal to (0, 255). In such scenarios, the one or more syntax elements may be signaled in the bitstream to derive the bit depth of the input signal.

In some embodiments, clipping is performed in a luma mapping chroma scaling (LMCS) mapped domain. LMCS has two main components: 1) a process for mapping input luma code values to a new set of code values for use inside the coding loop; and 2) a luma-dependent process for scaling chroma residue values. The first process, luma mapping, aims at improving the coding efficiency for standard and high dynamic range video signals by making better use of the range of luma code values allowed at a specified bit depth. The second process, chroma scaling, manages relative compression efficiency for the luma and chroma components of the video signal. The luma mapping process of LMCS is applied at the pixel sample level, and is implemented using a piecewise linear model. The chroma scaling process is applied at the chroma block level, and is implemented using a scaling factor derived from reconstructed neighboring luma samples of the chroma block. In some embodiments, the minimum and maximum values of the upper and lower bounds of the clipping range are derived by applying a forward LMCS look-up table (LUT) to the signaled minimum and maximum values. For example, if LMCS is enabled and clipping is performed in the LMCS mapped domain, the minimum and maximum values may be derived by applying a forward LMCS LUT to the signaled minimum and maximum values so that signaled values are mapped to new values (e.g., derived values) in the LMCS-mapped domain using the LMCS LUT.

As described above, more than one clipping range (e.g., two or more clipping ranges) may be used for the clipping processes within the processing pipeline. When two or more different clipping ranges are used for respective clipping operations, a first clipping operation may be performed on a first portion of encoded video data based on a first clipping range that is signaled in the bitstream; and a second clipping operation may be performed on a second portion of the encoded video data based on a second clipping range different from the first clipping range. As discussed above, each of the clipping ranges may be signaled or derived. For example, the first clipping range may be signaled and the second clipping range may be derived based on the signaled first clipping range (e.g., by applying a forward LMCS LUT based on the signaled maximum and minimum values). In this way, instead of signaling two pairs of minimum and maximum values, only one pair is signaled (e.g., the pair of signaled values is associated with the maximum and minimum values of a first clipping range), and the second pair is derived from the first pair. In this example, after LMCS, the signaled pair of values is applied to the first clipping range (e.g., outside of the LMCS mapped domain), and the derived pair of values (e.g., modified values from the signaled values) is applied to a the second clipping range (e.g., within the LMCS mapped domain).

In some embodiments, an adaptive clipping range may be determined based on a group of picture (GOP) structure, particularly for low-delay B (LDB) configurations. A group of pictures, or GOP structure, specifies the order in which intra- and inter-frames are arranged. In the low delay configurations, the first frame is an intra frame while the others are encoded as generalized P or B pictures. A low-delay B (LDB) configuration includes a first frame that is an intra frame, and the rest are encoded as B pictures. In some embodiments, one or more parameters of the adaptive clipping range are set based on the GOP structure.

In some embodiments, one or more of the clipping ranges (or clipping range parameters of an adaptive clipping range) are identified based on whether a low-delay B (LDB) configuration is active. For example, an adaptive clipping range, or different clipping ranges are used in LDB configurations as compared to random access configurations. In this way, a first clipping range may be used when the GOP structure is in a random access configuration and a second clipping range (e.g., different from the first clipping range) may be used when the GOP structure is in the LDB configuration. In some embodiments, the clipping range and/or clipping range parameter(s) are derived or otherwise identified after reordering is done to obtain a GOP pyramidal structure (e.g., a hierarchical coding structure).

In some embodiments, offsets or delta values compared to (e.g., relative to) a clipping range are signaled.

In some embodiments, one or more clipping ranges $(x_i, y_i)$ are determined based on a sum of a base clipping range values $(x_i^0, y_i^0)$ and a signaled offset values $(\Delta x_i, \Delta y_i)$ and used for the clipping processes. In some embodiments, a base clipping range value $(x^0, y^0)$ is determined based on the information related to the input (source) signal and/or the compression (codec) process, as described above; and an offset value $(\Delta x, \Delta y)$ is signaled in the bitstream for the whole sequence, picture, slice, tile, or other units. In some embodiments, the offset value $(\Delta x, \Delta y)$ is a single number (e.g., when the offset is symmetrical at the upper and lower bounds of the clipping range). In some embodiments, the offset value $(\Delta x, \Delta y)$ is a pair of numbers for a first offset to the lower bound and a second offset to the upper bound of the clipping range. The signaling can be performed at the high level such as in the sequence, picture, slice, or tile (or other units) parameter set.

In some embodiments, the clipping range (x, y) is designed (configured) to allow overwriting (e.g., can be overwritten) at specific levels. For example, a sequence level range $(x^0, y^0)$ is signaled first, but the signaled range may be overwritten by signaling a new range (x', y') at a lower level (e.g., picture level, slice level, or tile level), and overwrites (e.g., dominates) the range used at that level (e.g., for that picture, if the new range (x', y') is signaled at the picture level). In some embodiments, the overwritten range (x', y') is signaled directly. In some embodiments, the offset between the overwritten range (x', y') and the original range $(x^0, y^0)$ is signaled. For example, in a video of a concert, pictures at a sequence levels may have certain characteristics for the next n pictures in the sequence (e.g., the next 10 pictures may become very dark). As a result, the next n picture can have a reduced clipping range because the video data would likely be of low quality. Thus, the overwriting ability allows temporal and/or local adjustments of the clipping range to be made adaptively. For example, the overwriting is performed at a lower level than the original signaled unit, performed at picture level while a different setting is signaled at the sequence level, or performed at the block level while a different setting is signaled at the picture level.

In some embodiments, a base clipping range value $(x^0, y^0)$ is determined based on the information related to the input (source) signal and/or the compression (codec) process, for example, as described above, and multiple signaled offset values $(\Delta x_i, \Delta y_i)$ are separately signaled in the bitstream for a lower level (e.g., for each block). For example, each block may have one range with different blocks having different ranges. In some embodiments, a look-up table stores a plurality of predetermined offset values, and a signaled indicator (e.g., signaled index, or signaled indices) provides information about which of the predetermined offset values is to be used. The signaling can be done at the low level, such as at the coding unit, prediction unit, transform unit, or other lower levels, and one or more additional syntax elements are used to represent the range (e.g., the base clipping range $((x^0, y^0))$ in the bitstream.

In some embodiments, multiple base clipping range values $(x, y^0)$ are determined for each block separately based on the information related to the input (source) signal and/or the compression (codec) process, as described above, and multiple signaled offset value $(\Delta x_i, \Delta y_i)$ are separately signaled in the bitstream for a lower level (e.g., for each block). The signaling can be done at the low level, such as at the coding unit, prediction unit, transform unit, or other lower levels, and one or more additional syntax elements are used to represent the ranges (e.g., the multiple base clipping range values $(x_i^0, y_i^0)$) in the bitstream. For example, two look-up tables can store a plurality of predetermined offset values, and a plurality (e.g., a corresponding plurality) of base clipping ranges, and two signaled indicators (e.g., signaled index, or signaled indices) provides information about which of the predetermined offset values is to be used with which base clipping range, respectively.

In some embodiments, the derivation of offset value $(\Delta x_i, \Delta y_i)$ depends on the value of quantization parameter or quantization step size.

In some embodiments, different clipping ranges are used for different components (e.g., color components). For example, a first range $(x_L, y_L)$ is used for luma and a second range $(x_c, y_c)$ is used for chroma. Alternatively, a first range $(x_L, y_L)$ is used for luma, a second range $(x_{cb}, y_{cb})$ is used for the first chroma Cb component, and a third range $(x_{cr}, y_{cr})$ is used for the second chroma Cr component.

In some embodiments, one or more clipping ranges are derived using coded information, such as the reconstructed sample value range of one or multiple prediction blocks (e.g., a prediction block to which a uni-prediction is applied, or a prediction block to which bi-prediction is applied).

In some embodiments, more than one clipping range (e.g., two or more clipping ranges) is specified and used for the clipping processes within the processing pipeline. In some embodiments, values for a first clipping range are signaled and values for a second clipping range are derived at the decoder (e.g., based on the values for the first clipping range). For example, the values for the second clipping range may be derived by performing a look-up operation using the values for the first clipping range. In some embodiments, the more than one clipping range is defined in the codec and used for the clipping processes within the processing pipeline depending on the processing stage.

For example, one clipping range (e.g., a first clipping range) is specified and used for intra prediction and another clipping range (e.g., a second clipping range) is specified and used for all other processing stages.

Alternatively, or additionally, one clipping range (e.g., a first clipping range) is specified and used for intra prediction, another clipping range (e.g., a second clipping range) is specified and used for inter prediction, and yet another clipping range (e.g., a third clipping range) is specified and used for all other processing stages.

Alternatively, or additionally, one clipping range (e.g., a fourth clipping range, different from one or more of the first clipping range, the second clipping range, or the third clipping range) is specified and used for loop filters, including but not limited to deblocking, Sample Adaptive Offset (SAO), Adaptive Loop Filters (ALF), and Cross-Component Adaptive Loop Filter (CC-ALF). In some embodiments, different clipping ranges of the two or more different clipping ranges are to be used based on a GOP structure of the encoded video data.

In some embodiments, the loop filters, including but not limited to deblocking, SAO, ALF, and CC-ALF contain (e.g., are associated with) more than one clipping ranges. For example, these clipping ranges are specified to be used for the specific filter (or filters) within the loop filters.

In some embodiments, the specification of more than one clipping range and/or usage for specific processing stage is signaled in high-level syntax, including but not limited to a sequence level flag, a picture level flag, a subpicture level flag, a slice level flag, and/or a tile level flag.

In some embodiments, multiple clipping ranges are signaled in high-level syntax (HLS), and each clipping range is associated with an index value. For each predefined processing stage (e.g., intra prediction, inter prediction, or loop filtering), the index of the applied clipping range is signaled.

In some embodiments, the more than one clipping range is defined in the codec and used for the clipping processes within the processing pipeline depending on other coding tools that are/can be used in the coding/decoding process.

In some embodiments, one clipping range (e.g., a first clipping range) is specified and used if some tool(s) are enabled on high level such as at a sequence level, a picture level, or a slice level, and another clipping range (e.g., a second clipping range different from the first clipping range) is specified and used if these tool(s) are disabled. For example, if any of the coding tools changes the signal dynamic range during the processing, one clipping range (e.g., a third clipping range) is used before the coding tool is applied and another clipping range (e.g., a fourth clipping range) is used after the coding tool is applied. More than two coding ranges may be used in the process. An example of such a coding tool is Luma Mapping with Chroma Scaling (LMCS). In some embodiments, one of the two or more different clipping ranges is derived using an LMCS look-up table. For example, the LMCS look-up table is applied to values of a first clipping range to derive values for a second clipping range. For example, the first clipping range may be used for a portion of the encoded video data outside of an LMCS mapped domain and the second clipping range may be used for a portion of the encoded video data within the LMCS mapped domain.

Although FIGS. 4A and 4B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 450) of video decoding. The method includes receiving a video bitstream (e.g., a coded video sequence) that includes encoded video data and one or more syntax elements indicating (e.g., delta of offset from a base clipping range) one or more clipping ranges. The method includes deriving, based on the one or more syntax elements, the one or more clipping ranges for a portion (e.g., a sequence, a picture, a slice, a tile, a coding unit, a prediction unit, or a transform unit) of the encoded video data, where each of the one or more clipping ranges modifies a range of sample values of the received video bitstream. The method includes performing one or more clipping operations (e.g., not just a single color component) on the encoded video data using the derived one or more clipping ranges. In some embodiments, the portion is a high level portion such as a sequence, picture, slice, or tile parameter set, (e.g., header, a syntax table with the offset) and one clipping range (x,y) is signaled in the bitstream for the whole sequence, picture, slice, or tile. In some embodiments, one or more clipping ranges (x,y) are signaled in the bitstream and used for the clipping processes. In some embodiments, the one clipping range (x,y) is signaled in the bitstream for a whole sequence, picture, slice, or tile. The signaling can be performed at the high level such as a sequence, picture, slice, or tile parameter set, and can use one or more additional syntax elements to represent the range in the bitstream. In some embodiments, the one or more clipping ranges are signaled using a high-level syntax (HLS) element.

(A2) In some embodiments of A1, the one or more clipping ranges include an inclusive clipping range of 64 to 940. In some embodiments, the one or more syntax elements indicate one or more shifting offsets, and deriving the one or more clipping ranges comprises shifting a base clipping range based on the one or more shifting offsets to obtain respective modified clipping ranges different from the base clipping range (e.g., clipping ranges $(x_i, y_i)$ are determined based on a sum of a base clipping range values $(x_i^0, y_i^0)$ and signaled offset values $(\Delta x_i, \Delta y_i)$).

(A3) In some embodiments of A1 or A2, the one or more syntax elements indicate one or more shifting offsets, and deriving the one or more clipping ranges comprises shifting a base clipping range based on the one or more shifting offsets to obtain respective modified clipping ranges different from the base clipping range.

(A4) In some embodiments of A3, the one or more shifting offsets are determined (e.g., by the encoder and signaled in the bitstream) based on a value of a quantization parameter or a quantization step size. In some embodiments, the derivation of offset value $(\Delta x_i, \Delta y_i)$ depends on the value of quantization parameter or quantization step size.

(A5) In some embodiments of any of A1-A4, the encoded video data is encoded in accordance with a compression process, and the method further includes (i) deriving a bit depth n of the received video bitstream based on the one or more syntax elements; (ii) in accordance with a determination that the bit depth n of the received video bitstream is smaller than or equal to a bit depth m of the compression process, setting a clipping range of the one or more clipping ranges to (0, ((1<<n)−1)<<(m−n)); and (iii) in accordance with a determination that the bit depth n of the received video bitstream is larger than the bit depth m of the compression process, setting a clipping range of the one or more clipping ranges to (0, ((1<<m)−1)). In some embodiments, a clipping range (x, y) is determined based on the bit depths of the input signal. In some embodiments, if the bit depth of the input signal is n bits, and the bit depth of the codec is m bits, where m≥n, the clipping range is set equal to (0, ((1<<n)−1)<<(m−n)). For example, if the bit depth of the input signal is 8 bits, and the bit depth of the codec is 10 bits, the clipping range is set equal to (0, 1020). In some embodiments, one or more syntax elements are signaled in the bitstream to derive the bit depth of the input signal. In some embodiments, if the bit depth of the input signal is n bits, and the bit depth of the codec is m bits, where m<n, the clipping range is set equal to (0, ((1<<m)−1)). For example, the bit depth of the input signal is 10 bits, and the bit depth of the codec is 8 bits, and the clipping range is set equal to (0, 255). In some embodiments, one or more syntax elements are signaled in the bitstream to derive the bit depth of the input signal. In some embodiments, the clipping range (x, y) is determined based on the dynamic range of the input signal. In some embodiments, if the dynamic range of the input signal is the unrestricted (full) range from 0 to (1<<BitDepth)−1, the clipping range is set equal to (0, (1<<BitDepth)−1)). In some embodiments, one or more syntax elements are signaled in the bitstream to identify that the source signal has unrestricted range. In some embodiments, if the dynamic range of the input signal is the limited range from A to B, where A and B are predefined constant, the clipping range is set equal to (A, B). In this case one or more syntax elements are signaled in the bitstream to derive the constants A and B. As an example, if the dynamic range of the input signal is the limited range specified in one of the signal processing standards, e.g. (64, 940) for 10 bits signals, the clipping range may be set equal to (64, 940). In some embodiments, one or more syntax elements are signaled in the bitstream to specify this situation. In some embodiments, the clipping range (x,y) is determined based on the internal (codec) signal dynamic range. For example, if the internal (codec) signal is converted from one range domain to another, the clipping range is set equal to the final domain. In this case, the clipping range is determined based on the information from the bitstream that corresponds to internal signal conversion. In some embodiments, the internal (codec) signal originally had dynamic range (A, B), and during the compression process the dynamic range was changed to (C, D), then the clipping range is set equal to (C, D).

(A6) In some embodiments of A5, the bit depth of the compression process comprises an extended range associated with an intermediate processing step of the compression process (e.g., the compression process works with 2 bytes or 16 bits, can include filtering/precision processes that scale information up in some intermediate stages) that is larger than an original range, the bit depth being larger than an original bit depth of the compression process having a subset of the extended range. In some embodiments, the internal (codec) signal has a limited dynamic range, but within the compression process it is extended to full dynamic range from 0 to (1<<BitDepth)−1, and the clipping range is set equal to (0, (1<<BitDepth)−1).

(A7) In some embodiments of any of A1-A6, the method further includes determining one or more base clipping ranges (e.g., $(x^0, y^0)$) based on the received video bitstream (e.g., the input (source) signal) and/or parameters of a compression process used to encode the encoded video data, including: (i) in accordance with a determination that the one or more syntax elements comprises a single offset parameter for an inclusive base clipping range of the one or more base clipping ranges, where the base clipping range is associated with a portion of the received video bitstream, setting a clipping range of the one or more clipping ranges based on the single offset parameter and the base clipping range; and (ii) in accordance with a determination that the one or more syntax elements comprises a plurality of offset values for respective blocks: (a) in accordance with a determination that the respective blocks of the received video bitstream are associated with the base clipping range of the one or more base clipping ranges, setting respective clipping ranges for the respective blocks based on the plurality of offset values and the base clipping range; and in accordance with a determination that the respective blocks of the received video bitstream are associated with respective base clipping ranges of the one or more base clipping ranges, setting respective clipping ranges for the respective blocks based on the plurality of offset values and the respective base clipping range. In some embodiments, one or more clipping ranges $(x_i, y_i)$ are determined based on a sum of a base clipping range values $(x_i^o, y_i^o)$ and a signaled offset values $(\Delta x_i, \Delta y_i)$ and used for the clipping processes. In some embodiments the base clipping range value $(x^o, y^o)$ is determined based on the information related to the input signal and/or the compression process; and the signaled offset value $(\Delta x, \Delta y)$ is signaled in the bitstream. The signaling can be performed at the high level such as a sequence, picture, slice, or tile parameter set. In some embodiments, the base clipping range value $(x^o, y^o)$ is determined based on the information related to the input signal and/or the compression process; and multiple signaled offset values $(\Delta x_i, \Delta y_i)$ that are signaled in the bitstream for each block separately. The signaling can be performed at the low level (such as a coding, prediction, or transform unit) and can use one or more additional syntax elements to represent the range in the bitstream. In some embodiments, the multiple base clipping range values $(x_i^o, y_i^o)$ are determined for each block separately based on the information related to the input (source) signal and/or the compression (codec) process; and the multiple signaled offset value $(\Delta x_i, \Delta y_i)$ that are signaled in the bitstream for each block separately. The signaling can be done at the low level such as a coding, prediction, or transform unit and can use one or more additional syntax elements to represent the range in the bitstream.

(A8) In some embodiments of any of A1-A7, the method further includes overwriting a clipping range of the one or more clipping ranges at a specified lower level, where the one or more syntax elements comprise an overwritten clipping range or an offset between the overwritten clipping range and a base clipping range. For example, the system is configured to apply some local changes temporally, e.g., a sequence level range $(x^o, y^o)$ is firstly signaled, but the signaled range can be overwritten by signaling a new range $(x', y')$ at picture level. In some embodiments, the clipping range $(x, y)$ is designed to allow overwriting at specific levels. For example, a sequence level range $(x^o, y^o)$ is signaled, and the signaled range may be overwritten by signaling a new range $(x', y')$ (e.g., at picture level). In some embodiments, the overwritten range $(x', y')$ is signaled directly or signaled by the offset between overwritten range $(x', y')$ and original range $(x^o, y^o)$.

(A9) In some embodiments of any of A1-A8, different clipping ranges are used for clipping operations on different color components. In some embodiments, different clipping ranges are used for different component. In some embodiments, a first range $(x_L, y_L)$ is used for a luma component and a second range $(x_c, y_c)$ is used for a chroma component. In some embodiments, a first range $(x_L, y_L)$ is used for luma, a second range $(x_{cb}, y_{cb})$ is used for a first chroma (Cb) component and a third range $(x_{cr}, y_{cr})$ is used for a second chroma (Cr) component.

(A10) In some embodiments of any of A1-A9, the one or more clipping ranges are derived using coded information. In some embodiments, the clipping ranges are derived based on the reconstructed sample value range of one or multiple prediction block, e.g., whether a uni-prediction or a bi-prediction is applied.

(A11) In some embodiments of any of A1-A10, respective clipping ranges (e.g., $(x_i, y_i)$) are signaled in the bitstream for each block i separately. For example, the signaling can be performed at the low level and can use one or more additional syntax elements to represent the range in the bitstream. In some embodiments, a clipping range of the clipping ranges is determined based on the information related to the input signal and/or the compression process and used for the clipping processes.

(B1) In another aspect, some embodiments include a method (e.g., the method 400) of video encoding. The method includes: (i) receiving a current picture (e.g., an original or prefiltered picture); (ii) determining for the current picture, based on characteristics of the current picture, a first portion of the current picture to be clipped with a first clipping range, where the first clipping range is different from a default range associated with the current picture; and (iii) encoding, into a video bitstream, information indicating the first clipping range. For example, the characteristics of the current picture may include a dynamic range of the signals in the current picture, quantization noise associated with the current picture, and/or input signal bit depth of the current picture. In some embodiments, a first clipping range is signaled in the video bitstream and a second clipping range is derived during video decoding based on the first clipping range.

(B2) In some embodiments of B1, the method includes receiving a video sequence (e.g., from video source 104) that includes the current picture.

(B3) In some embodiments of B1 or B2, the method further includes encoding the current picture in the video bitstream.

(B4) In some embodiments of any of B1-B3, the information indicating the first clipping range is signaled via one or more indicators (e.g., one or more syntax elements). In some embodiments, the one or more indicators are signaled in a high-level syntax.

(B5) In some embodiments of any of B1-B4, the method further includes determining a second clipping range and encoding the second clipping range in the video bitstream.

(B6) In some embodiments of any of B1-B5, the method further includes determining a second portion of the current picture to be clipped with a second clipping range and signaling the second portion and/or the second clipping range in the video bitstream.

(C1) In another aspect, some embodiments include a method of performing a conversion between a visual media file and a bitstream of visual media data. The method includes: obtaining a visual media file (e.g., from video source 104); and performing a conversion between the visual media file and a bitstream of a visual media data, where the bitstream indicates a first clipping range to be applied to a first portion of the visual media data. In some embodiments, the bitstream further indicates a second clipping range to be applied to a second portion of the visual media data. In some embodiments, the bitstream includes one or more offset values indicating a difference between the first clipping range and a default clipping range.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A10, B1-B6, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A10, B1-B6, and C1 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising encoded video data and one or more syntax elements indicating delta values for a dynamic clipping range for a picture of the encoded video data, wherein the delta values indicate deviations from a 10-bit range of sample values from 64 to 940;
   deriving, based on the one or more syntax elements, the dynamic clipping range for the picture of the encoded video data, wherein the dynamic clipping range modifies the 10-bit range of sample values; and
   performing one or more clipping operations on the encoded video data using the dynamic clipping range.

2. The method of claim 1, wherein deriving the dynamic clipping range comprises obtaining a modified clipping range different from a base clipping range.

3. The method of claim 1, wherein the encoded video data is encoded in accordance with a compression process, and the method further comprises:
   deriving a bit depth n of the received video bitstream based on the one or more syntax elements;
   in accordance with a determination that the bit depth n of the received video bitstream is smaller than or equal to a bit depth m of the compression process, setting the dynamic clipping range to $(0, ((1<<n)-1)<< (m-n))$; and
   in accordance with a determination that the bit depth n of the received video bitstream is larger than the bit depth m of the compression process, setting the dynamic clipping range to $(0, ((1<<m)-1))$.

4. The method of claim 3, wherein the bit depth m of the compression process comprises an extended range associated with an intermediate processing step of the compression process that is larger than an original range, the bit depth m being larger than an original bit depth of the compression process having a subset of the extended range.

5. The method of claim 1, further comprising:
   determining one or more base clipping ranges based on at least one of the received video bitstream and parameters of a compression process used to encode the encoded video data, comprising:
   in accordance with a determination that the one or more syntax elements comprises a single offset parameter for an inclusive base clipping range of the one or more base clipping ranges, wherein the base clipping range is associated with the picture of the received video bitstream, setting the dynamic clipping range based on the single offset parameter and the base clipping range; and
   in accordance with a determination that the one or more syntax elements comprises a plurality of offset values for respective blocks:
   in accordance with a determination that the respective blocks of the received video bitstream are associated with the base clipping range of the one or more base clipping ranges, setting respective clipping ranges for the respective blocks based on the plurality of offset values and the base clipping range; and
   in accordance with a determination that the respective blocks of the received video bitstream are associated with respective base clipping ranges of the one or more base clipping ranges, setting respective clipping ranges for the respective blocks based on the plurality of offset values and the respective base clipping range.

6. The method of claim 1, further comprising:
   overwriting the dynamic clipping range at a specified lower level.

7. The method of claim 1, wherein different clipping ranges are used for clipping operations on different color components.

8. A method of video encoding performed at a computing system having memory and one or more processors, the method comprising:
   receiving a video data comprising a plurality of pictures, including a first picture;
   determining a dynamic clipping range for the first picture based on the video data, wherein the dynamic clipping range modifies a 10-bit range of sample values from 64 to 940; and
   signaling, via a video bitstream, one or more syntax elements indicating delta values for the dynamic clipping range for the first picture.

9. The method of claim 8, wherein the dynamic clipping range is derived by shifting a base clipping range to obtain a modified clipping range different from the base clipping range.

10. The method of claim 8, further comprising:
    deriving a bit depth n for the video data;
    encoding the video data in accordance with a compression process;
    in accordance with a determination that the bit depth n is smaller than or equal to a bit depth m of the compression process, setting the dynamic clipping range to $(0, (1<<n)-1)<<(m-n))$; and
    in accordance with a determination that the bit depth n is larger than the bit depth m of the compression process, setting the dynamic clipping range to $(0, ((1<<m)-1))$.

11. The method of claim 8, further comprising:
    overwriting the dynamic clipping range at a specified lower level; and
    signaling the overwriting via the video bitstream.

12. The method of claim 8, wherein different clipping ranges are used for clipping operations on different color components.

13. A method of processing visual media data, the method comprising:
    obtaining a source video sequence that comprises a plurality of frames; and
    performing a conversion between the source video sequence and a video bitstream of visual media data according to a format rule,
    wherein the video bitstream comprises one or more syntax elements and a plurality of encoded pictures including a first picture, wherein the one or more syntax elements indicate delta values for a dynamic clipping range for the first picture, and wherein the delta values indicate deviations from a 10-bit range of sample values from 64 to 940; and
    wherein the format rule specifies that:
      the dynamic clipping range for the first picture is to be derived based on the one or more syntax elements, wherein the dynamic clipping range modifies the 10-bit range of sample values; and
      one or more clipping operations are to be performed on the first picture using the dynamic clipping range.

14. The method of claim 13, wherein the format rule further specifies that:
    a bit depth n is to be derived for the source video sequence;
    the source video sequence is encoded in accordance with a compression process;
    when the bit depth n is smaller than or equal to a bit depth m of the compression process, the dynamic clipping range is to be set to $(0, ((1<<n)-1)<< (m-n))$; and
    when the bit depth n is larger than the bit depth m of the compression process, the dynamic clipping range is to be set to $(0, ((1<<m)-1))$.

15. The method of claim 13, wherein the dynamic clipping range is to be overwritten at a specified lower level.

16. The method of claim 13, wherein different clipping ranges are used for clipping operations on different color components.

* * * * *